United States Patent [19]

Malkamäki et al.

[11] Patent Number: 5,828,650
[45] Date of Patent: Oct. 27, 1998

[54] COMBINED MODULATION—AND MULTIPLE ACCESS METHOD FOR RADIO SIGNALS

[75] Inventors: Esa Malkamäki, Espoo; Jari Junell, Vantaa, both of Finland

[73] Assignee: Nokia Mobile Phones Ltd., Salo, Finland

[21] Appl. No.: 674,350

[22] Filed: Jul. 2, 1996

[30] Foreign Application Priority Data

Jul. 3, 1995 [FI] Finland .................................... 953283

[51] Int. Cl.⁶ .................................................. H04J 11/00
[52] U.S. Cl. ........................ 370/203; 370/478; 375/260; 375/283; 375/362; 455/59
[58] Field of Search .................................. 370/480, 540, 370/208; 375/308, 329, 322, 323, 260, 316, 330, 283; 455/59

[56] References Cited

U.S. PATENT DOCUMENTS

| | | | |
|---|---|---|---|
| 4,881,241 | 11/1989 | Pommier et al. | 375/260 |
| 4,881,245 | 11/1989 | Walker et al. | 375/260 |
| 5,274,629 | 12/1993 | Helard et al. | 455/59 |
| 5,282,222 | 1/1994 | Fattouche et al. | 375/219 |
| 5,345,440 | 9/1994 | Gledhill et al. | 370/210 |
| 5,406,551 | 4/1995 | Saito et al. | 370/203 |
| 5,422,913 | 6/1995 | Wilkinson | 375/260 |
| 5,444,697 | 8/1995 | Leung et al. | 370/207 |
| 5,550,812 | 8/1996 | Philips | 370/203 |

FOREIGN PATENT DOCUMENTS 0 553 841 A3  8/1993  European Pat. Off. .

Primary Examiner—Benedict V. Safourek
Assistant Examiner—Kenneth Vanderpaye
Attorney, Agent, or Firm—Perman & Green, LLP

[57] ABSTRACT

The invention relates to the organization of phase references in a data transfer system based upon the multiplexing of orthogonal frequency components, when transmissions in the system are composed of relatively short symbol sequences. In accordance with the invention, in the first symbol (OS1) of the sequence differential phase-shift keying between elementary signals is carried out, based upon a phase reference (Ref) transmitted in one or several subfrequency bands (fc) and upon a phase shift chain propagated one subfrequency thereof at a time. In each subfrequency band in the subsequent symbols of the sequence phase-shift modulation refers to the elementary signal of the preceding symbol of the same subfrequency band. The invention may be applied with benefit to digital cellular network systems which employ the OFDM method.

7 Claims, 6 Drawing Sheets

COMBINED MODULATION— AND MULTIPLE ACCESS METHOD FOR RADIO SIGNALS

FIELD OF THE INVENTION

The invention relates in general to the modulation and division of radio signals for multiple access and in particular to a method for application to orthogonal frequency-division multiplexing (OFDM), whereby the transmission of the phase reference of phase-modulated information is arranged between information elements. Use of the method according to the invention concerns cellular network telephone systems in particular.

BACKGROUND OF THE INVENTION

If one wants to increase the existing volume of information transmitted by radio especially in a radio data communication system which comprises mobile terminals and suffers from multipath propagation and attenuation, one quickly comes up against the physical limitations of the methods which are currently employed. To experts in the field it is clear that methods must be developed which on the one hand divide the available frequency spectrum more efficiently among users and on the other hand enhance the resistance of the transmitted signal to problems caused by reflection, interference and shadowing.

A radio channel may be characterized by its impulse response, widening of which in the directions of time and frequency is inversely proportional to the quality of the communication. In an urban area the duration of the impulse response is normally several microseconds, sometimes even in excess of 10 μs. In addition, the response characteristics of the channel are changing continuously, as the location of the receiver, for example a mobile telephone, changes. With such response characteristics prevailing, a single frequency radio channel may be used for data transfer at a rate of not more than several tens of kilobits per second, unless a special equalizer is used. In data transfer applications, however, and particularly in the case of multiple access, data rates in terms of megabits per second are required.

A solution which has become known recently is orthogonal frequency-division multiplexing, which is most easily described in terms of time and frequency with the aid of FIG. 1a. Here use is made of a relatively wide frequency band F (for example of 1 MHz), which is divided into narrow subfrequencies f (subcarriers), of which there may for example be 2,000. At each subfrequency f information is transmitted at a relatively slow rate, which is so chosen that on the one hand the above-mentioned disturbances have as little effect as possible and on the other hand the data transfer capacity of the entire system is maximized. Temporally each subfrequency thus comprises successive slots T, during each of which the information encoded in the transmitted signal at the subfrequency in question does not change. In the time-frequency domain as shown in FIG. 1a squares R are formed which in the frequency direction are one subfrequency in width and in the time direction as long as the time constant of the system, and each of which conveys data of the order of one elementary signal. The width of the subfrequency f and the time constant T of the system, that is, the width and length of the square are generally the inverse of each other. In practice, in between the time slots with duration of time constant T guard intervals are added as shown in FIG. 1b, the length of these intervals being dependent upon the duration of channel impulse response which is required in the system.

The transmission of one logical data transfer channel occurs through an OFDM data transfer communication in accordance with FIG. 1a in such a way that the information contained in the channel is digitized and divided into elementary signals, which are scattered over different subfrequencies and different time intervals, that is into the squares R in FIG. 1a, in accordance with a particular encoding method. When the used encoding method is known to the receiver, it may reconstruct an information stream corresponding to a logical data transfer channel by decoding, out of the entire received OFDM band, only those elementary signals which belong to the channel in question. Instructions which reveal the association and sequence of certain elementary signals are termed control links L and they are shown in FIG. 1a as connecting broken lines. Since not all subfrequencies are generally attenuated or reflected in the same way even in a poor connection, this arrangement offers the particular advantage that the disturbances within a specific narrow frequency range do not destroy the entire signal. In addition, the data transfer rate required of a logical data transfer channel may be dynamically increased or reduced by allocating more or less squares R for its use.

A column of the length of one time constant, which thus contains data of as many elementary signals as there are subfrequencies in the system, is designated with the OFDM symbol OS. It is important to note that one OFDM symbol OS does not correspond to the conventional symbol concept, which is perceived as a mark of a character string and which is usually represented by a byte eight bits in length. One OFDM symbol OS may contain hundreds of bits of data and the data bits contained therein are not necessarily applied to the same logical data transfer channel, let alone to the same byte or the same string symbol in a symbol sequence.

The OFDM system according to the prior art has been developed principally for future digital broadcasting. Standard ETS 300 401 of the European Broadcasting Union (EBU) and European Telecommunications Standards Institute (ETSI) sets out the Digital Audio Broadcasting (DAB)® system, in which transmission consists of transmission frames, the length of which may, depending upon the operating mode, be 24 or 96 milliseconds. Viewed from the standpoint of the radio signal to be transmitted, each transmission frame is a series of OFDM symbols, while on the logical level it contains many logical data transfer channels, which are divided in the above-mentioned manner into elementary signals contained by OFDM symbols. The modulation method whereby successive elementary signals of one subfrequency are transferred to a radio signal is in the proposed DAB® system differential quadrature phase-shift keying (DQPSK), a modulation method which in itself is familiar to those skilled in the art. Here the content of the OFDM symbol at one subfrequency follows the formula $$z_{l,k}=z_{l-1,k}y_{l,k} \qquad (1)$$

where $z_{l,k}$ is the content of OFDM symbol l at subfrequency k, $z_{l-1,k}$ is the content of the preceding OFDM symbol l−1 at the same subfrequency k and $y_{l,k}$ is the input data corresponding to $z_{l,k}$ at the input port of the differential QPSK modulator which carries out the phase modulation.

For the purpose of clarification of the information content of the differential QPSK-modulated signal, some phase reference must be attached to it which does not contain actual information for transmission but by comparison with which the information for transmission which is contained in other parts of the signal becomes clear. In the DAB® system, where each transmission frame contains many OFDM symbols, there is at the beginning of the frame a phase reference symbol OS 1 as shown in FIG. 2a, each elementary signal of which contains phase reference information relating to the subfrequency f in question. Elementary signals of the same subfrequency which belong to successive symbols form a phase reference chain, the head of which is the elementary signal of the subfrequency in the phase reference symbol in question and the other elementary signals of which refer always to the temporally preceding elementary signal at the same subfrequency. This arrangement is represented in FIG. 2a, with the arrows portraying the phase references.

An arrangement as proposed, in which the first OFDM symbol in the symbol sequence as a transmission frame contains at all subfrequencies the phase reference alone, is favoured in particular by the relatively large quantity of actual information symbols (approximately 150) contained in the transmission frame, that is to say by the good temporal efficiency, and by the fact, that since broadcasting is involved, all symbols are transmitted at the same power, so that there are no phase errors due to changes in the transmission power.

A combined OFDM- and DQPSK method as described is however poorly suited for use by future cellular networks, considering that the time-division multiple access (TDMA) system, which has been used and has proved effective in current networks, is still in use. In the TDMA system, which represents technology familiar to those skilled in the art the same frequency range is used by a large number of users, for each of whom certain cyclically recurring time slots are allocated for the purpose of transmission and reception. Typically, each user's terminal would send and/or receive during its own time slot several OFDM symbols. If one of these symbols has to be reserved as a reference symbol (OS1 in FIG. 2a), the temporal efficiency is reduced, since there is then correspondingly less time available for the actual information which is to be transmitted. Division of the phase reference among users or the extension of its validity over many user-specific time slots is not possible in transmission from a user's terminal to the base station ("uplink transmission"), since different users send with different equipment from different locations at different times. In a transmission from the base station to the user's terminal device ("downlink transmission"), sending of the same phase reference to different users would in principle be possible, but since it is advantageous for the base station to send to nearby and distant users at a different power, changing the transmission power between the OFDM symbols sent by it would be difficult to carry out without phase errors.

From the publication "Weinstein, S. B.; Ebert, Paul M.: Data Transmission by Frequency-Division Multiplexing Using the Discrete Fourier Transform, IEEE Transactions on Communication Technology, Vol. COM-19, No.5, Oct. 1971" is known the alternative phase reference transmission method according to FIG. 2b, where in accordance with the publication the phase reference is transmitted at the first subfrequency f1 and where phase modulation of other subfrequencies in the OFDM symbol occurs differentially in such a way that the modulation of a second subfrequency f2 is defined as the phase shift to the said first subfrequency, the modulation of the third subfrequency f3 correspondingly as the phase shift to the said second subfrequency, and so forth. The elementary signals of the same symbol form a phase reference chain, the head of which is the elementary signal which contains the phase reference (in the Figure, the elementary signal of first subfrequency f1). The phase of the adjacent frequency is determined in such a way that the phase shift to the said phase reference corresponds to the bit content of the elementary signal of the subfrequency in question as is usual in the case of quadrature phase-shift keying (QPSK): each of the bit configurations 00, 01, 10 and 11 corresponds to one of four mutually orthogonal phases in accordance with FIG. 2c (the bit configuration 00 shown in the Figure corresponding to phase ρ) and two successive bit configurations in the digital information for transmission represent a corresponding phase displacement in the phase modulating subfrequency.

Use of the alternative phase reference method according to FIG. 2b presupposes that, in the frequency response of the wide-band radio channel formed from the subfrequencies, no large frequency-dependent changes occur which could distort the phase relations of the subfrequencies. In systems which deal with fast moving receivers and which suffer from reflections and shadowing, this condition is not frequently fulfilled, so that this reference transmission method is also, as such, poorly suited to mobile telephone systems.

SUMMARY OF THE INVENTION

The objective of the invention is to propose a method and equipment which make possible rapid and reliable data transfer communication between a transmitter—and a receiver device. The aim of the invention is also to propose a method and equipment whereby the signal processing principle based upon orthogonal frequency-division multiplexing (OFDM) may be applied to data transfer between the base station and a terminal device in a cellular network. A further objective of the invention is the combining of the OFDM method and of differential quadrature phase-shift keying (DQPSK) in a particularly favourable manner.

The objectives of the invention are achieved by encoding the information for transmission, elementary signal by elementary signal, by phase-shift keying, applying the phase reference relating to the first symbol of the OFDM symbol sequence for transmission to at least one subchannel thereof and feeding the phase information therefrom to other subchannels and subsequently using the phase information thus transmitted from one OFDM symbol to another per subchannel in the same sequence.

A characteristic of the method according to the invention for applying data for transfer to a radio frequency signal which comprises a symbol sequence formed from symbols including the elementary signals of the subfrequency bands is that the said data for transfer is applied to the said radio frequency signal by the phase modulation method, whereby:

the first symbol of the said symbol sequence comprises the first elementary signal, which contains the phase reference, the information content of other elementary signals of the said first symbol is defined as the phase shift in frequency direction to the adjacent elementary signal, forming a differential phase-shift keying chain, the head of which is the said first elementary signal, and the information content of each elementary signal in other symbols of the said symbol sequence is defined as the phase shift to the preceding elementary signal in time direction of the same subfrequency band, forming a differential phase-shift keying chain, the head of which is the elementary signal of the first symbol of the said symbol sequence in the subfrequency band in question.

The invention also relates to both the transmitter—and the receiver hardware for implementation of the said method. A characteristic of the transmitter equipment according to the invention is that it comprises facilities for the formation of differential phase-shift keying between temporally simultaneous elementary signals belonging to different subfrequency bands and facilities for the formation of differenitial phase-shift keying between temporally successive elementary signals belonging to the same subfrequency band. A characteristic of the receiver equipment according to the invention is that it comprises facilities for decoding of data from differential phase-modulation chains formed by the said elementary signals, which chains comprise elementary signals of the same symbol in different subfrequency bands or elementary signals of the same subfrequency band in different symbols.

The invention is based upon a concept wherein the above-mentioned phase reference transmission procedures may be combined in a novel way. Since in the proposed embodiments of the invention the quantity of OFDM symbols belonging to the same link which are to be transmitted at one time is relatively small, that is to say the OFDM symbol sequence is relatively short, it is not worth sacrificing one entire symbol for the purpose of transmitting the phase reference at all subfrequencies. Only one subfrequency or only a relatively small number of subfrequencies is allocated for the phase reference of the first symbol, in which case modulation of the other subfrequencies occurs by feeding the phase information differentially from one subfrequency to another. When after transmission certain phase information is obtained with the first symbol for all subfrequencies, phase modulation per subfrequency of the subsequent symbols belonging to the same sequence is defined as the phase shift in the preceding symbol to the signal transmitted at the same subfrequency.

BRIEF DESCRIPTION OF THE DRAWINGS

The invention is explained below in detail with the aid of a favourable embodiment and with reference to the attached drawings, where

In the above description of the prior art, reference has been made to FIGS. 1a–2c, and so below reference will be made to FIGS. 3–4b. In the drawings the same reference numbers are used for similar parts.

In FIG. 3 the OFDM signal, which is itself based upon known technology, is divided in the frequency direction into subfrequencies f, fc, fc' in the manner characteristic of the technology in question. Temporally the OFDM signal is likewise divided into OFDM symbols in the known manner, in which case one OFDM symbol comprises one simultaneously transmitted and received block of length of time constant T of each subfrequency. In the drawing, the first OFDM symbol OS1 is specially marked with hatching.

It is assumed that one wants the data for transmission to be encoded in the subfrequency by the specific phase-shift keying method (PSK). In that case some phase reference is necessary, by comparison with which the transmitter stepwise alters the phase of the subfrequencies for transmission of the digital information for encoding in a specified manner and by comparison with which the receiver is able to reconstruct the same information by decoding the phase displacements appearing in the received subfrequencies. In the method according to the invention, in which the OFDM symbols form relatively short sequences, one fc or several of the subfrequencies comprised by the first OFDM symbol are used as the phase reference of the first symbol OS1.In that case the phase of the other subfrequencies f, fc' is compared with the phase of the subfrequency in question fc by some suitable procedure.

Figure 1A:
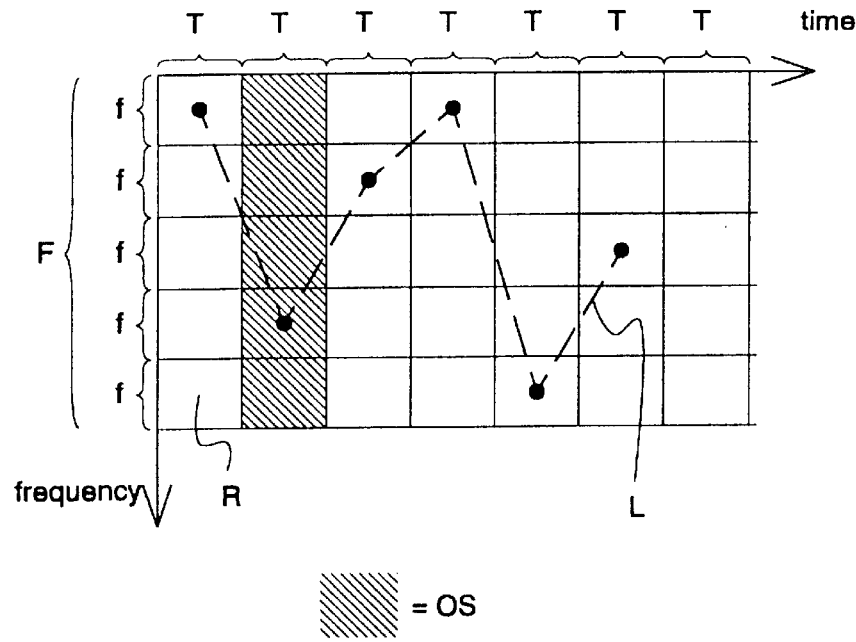
FIG. 1a represents the known OFDM principle.
Figure 1B:
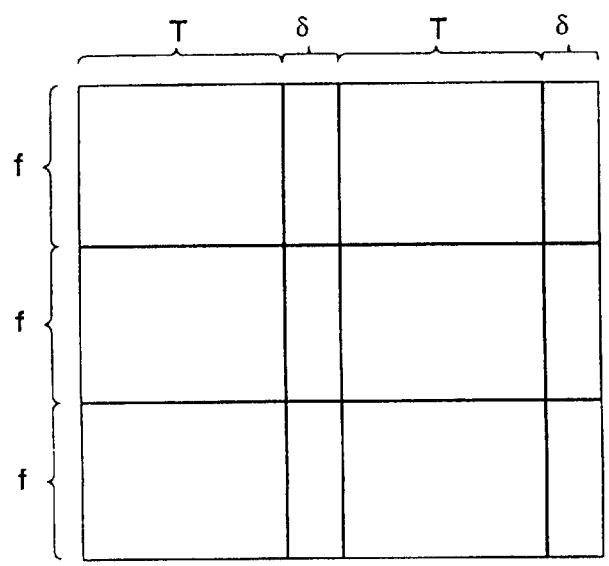
FIG. 1b represents the known use of a guard interval between the OFDM symbols.
Figure 2B:
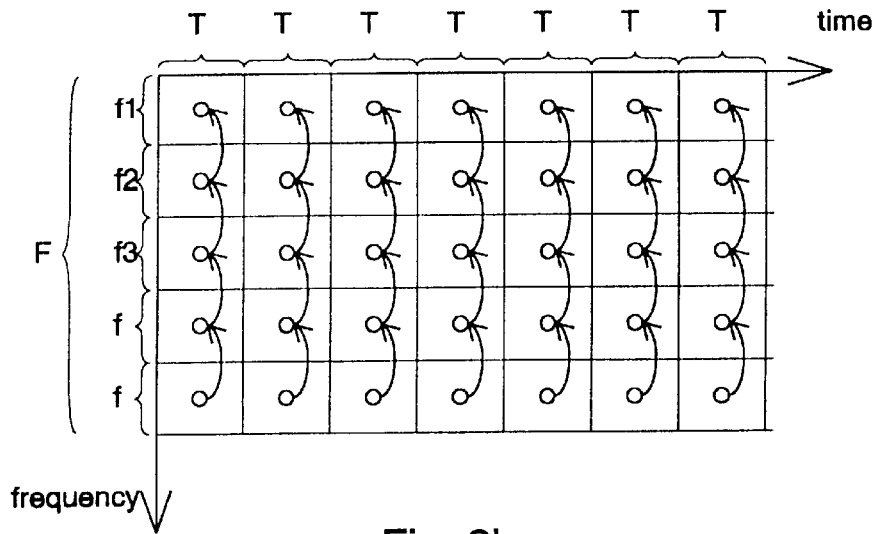
FIG. 2b represents the known derivation of the differential phase information from the temporally simultaneous phase reference.
Figure 2A:
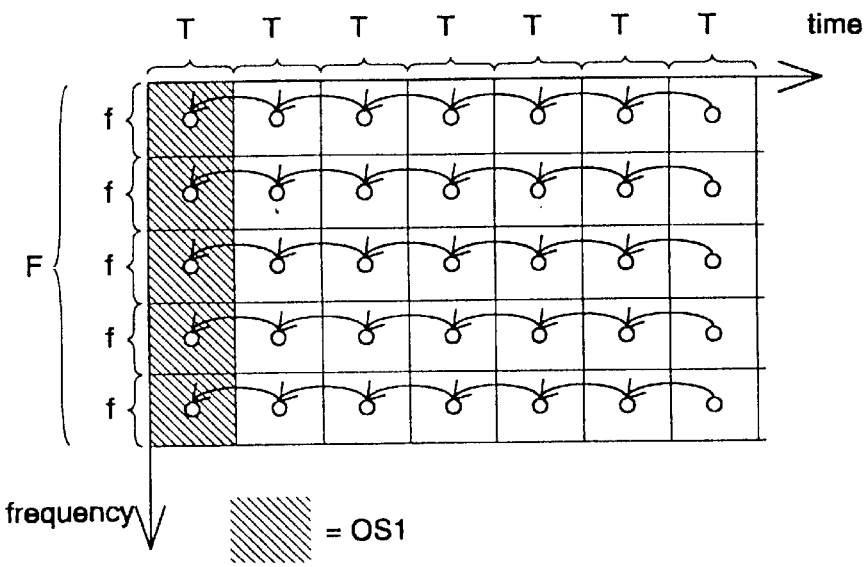
FIG. 2a represents the known derivation of the differential phase information from the temporally preceding phase reference.
Figure 2C:
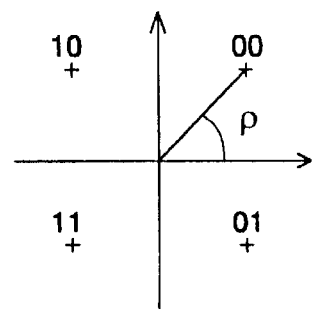
FIG. 2c represents the known correspondence between two-bit bit configurations and the phase of the phase-modulated signal.
Figure 3:
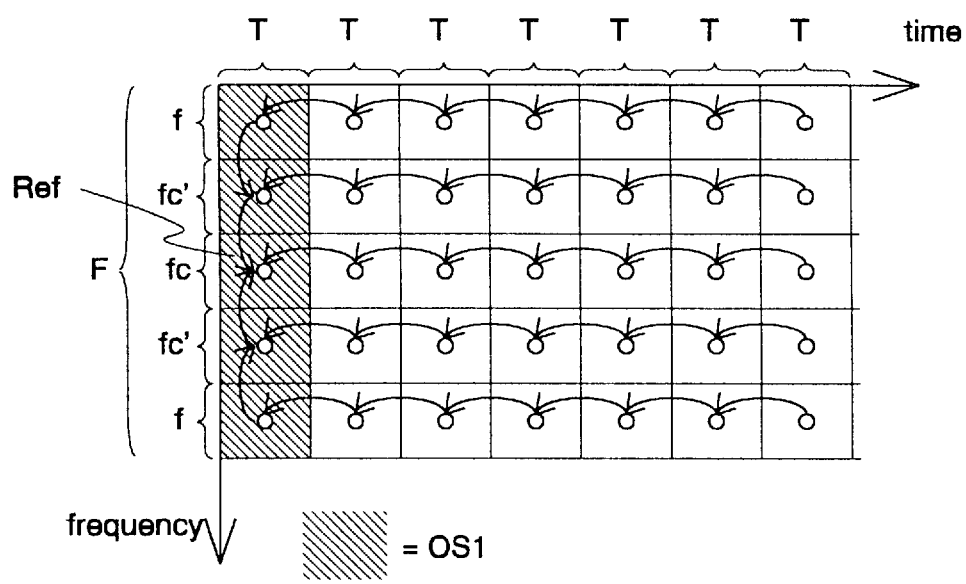
FIG. 3 represents the derivation of differential phase information in accordance with an embodiment of the invention.

FIG. 3 shows the situation in which the elementary signal Ref of subfrequency fc forms the phase reference of the subfrequencies of the first OFDM signal OS1 in the sequence. For the formation of phase modulation of adjacent subfrequencies fc' a phase displacement is effected in these to the phase of subfrequency fc, the magnitude of which corresponds to the bit configuration to be encoded in the known manner as shown in FIG. 2c. Subfrequency fc', the phase modulation of which is thus formed, is used in turn as a phase reference in modulation of the subsequent subfrequencies f, in which case the procedure is specifically termed differential quadrature phase-shift keying (D-QPSK). Reference to the phase of the adjacent subfrequency for the purpose of formation of phase modulation in the first OFDM symbol OS1 has been shown in FIG. 3 by the vertical arrow inside the hatched first OFDM symbol OS1.

By adapting formula 1 above, it may be demonstrated that the content of the first OFDM symbol in the sequence OS1, which is formed by the method according to the invention, conforms at one subfrequency k to the formula $$z_{l,k}=z_{l,k-1}y_{l,k}, \qquad (2)$$

where $z_{l,k}$ is the content of OFDM symbol l at subfrequency k, $z_{l,k-1}$ is the content of the same OFDM symbol l at the adjacent subfrequency k−1 and $y_{l,k}$ is the input data corresponding to $z_{l,k}$ at the input port of the differential QPSK modulator which carries out phase modulation.

The receiver according to the invention must know which of the subfrequencies of the first OFDM signal received by it forms the head of the phase reference chain, that is, the actual phase reference (in FIG. 3 subfrequency fc and its elementary signal Ref). The information contained by the subfrequencies is decoded on the basis of the phase displacements appearing therein in the same way as has been mentioned in relation to the general principle of quadrature phase-shift keying (QPSK): a subsequent phase displacement applied to a certain decoded bit configuration 00, 01, 10 or 11 denotes the phase quarter to which, as shown in FIG. 2c, there is displacement, that is, which is the next bit configuration.

With regard to the invention it is not in itself important which of the subfrequencies of the first OFDM signal form(s) the phase reference or how many phase reference subfrequencies are required. These circumstances may be optimized for each system taking into account problems of radio propagation and the limitations imposed on the complexity of the hardware. During the research which led to the invention it has been estimated that in a favourable embodiment one requires one phase reference subfrequency fc for approximately each hundred subfrequencies fc', f, containing actual information for transmission. It has also been estimated that it is not worth placing the phase reference fc at the outermost subfrequency of the first OFDM signal OS1, since the OFDM signals transmitted by adjacent frequency bands could then interfere with each other. In FIG. 3 the phase reference transmission subfrequency fc is for example placed in the middle of the frequency band F. When the first OFDM symbol OS1 has been formed and transmitted from the transmitter to the receiver in accordance with the method explained above, there exists in both the transmitter and the receiver certain phase information at each subfrequency. Thereafter it is advisable to carry out phase modulation of the next signals in the same sequence in such a way that at each subfrequency fc, fc', f, the phase reference used is the elementary signal which belonged to the preceding symbol of the same sub-frequency. The content of the subsequent OFDM symbols at each subfrequency then in fact complies with formula 1 shown above. This reference principle is illustrated by an arrow pointing from one symbol to the other, with each horizontal line in FIG. 3 corresponding to one subfrequency.

Next we will deal with application of the method according to the invention to a cellular network employing time-division multiple access (TDMA). In a known GSM mobile telephone system which employs the TDMA principle, which system is used as an example illustrating the possibilities of application of the invention, each user receives for his use one of eight cyclically recurring time slots. In the research which led to the invention it was estimated that in one time slot around 1–12 OFDM symbols may be transmitted. As indicated above in discussion of the prior art for the purpose of maintaining the temporal efficiency it is not worth sacrificing one of these symbols to permit transmission of the phase reference symbol according to the prior art which comprises all subfrequencies. In equipment incorporating the method according to the invention, a connection or link between each terminal device and the base station which is in radio communication with it is completely independent of other links, since the phase information is transmitted for each link in the first symbol of each symbol sequence, but in such a way that most of its content is actual data for transfer.

The base station of a cellular network employing the method according to the invention is free to use differing output powers for maintenance of each link, since changes in the transmission power causes possible phase errors only between two TDMA time slots and thus between OFDM symbols intended for two different terminal devices, in which cases the phase errors are not significant. Terminal devices sending in the direction of the base station need not have any information about the phase of the others.

Figure 4A:
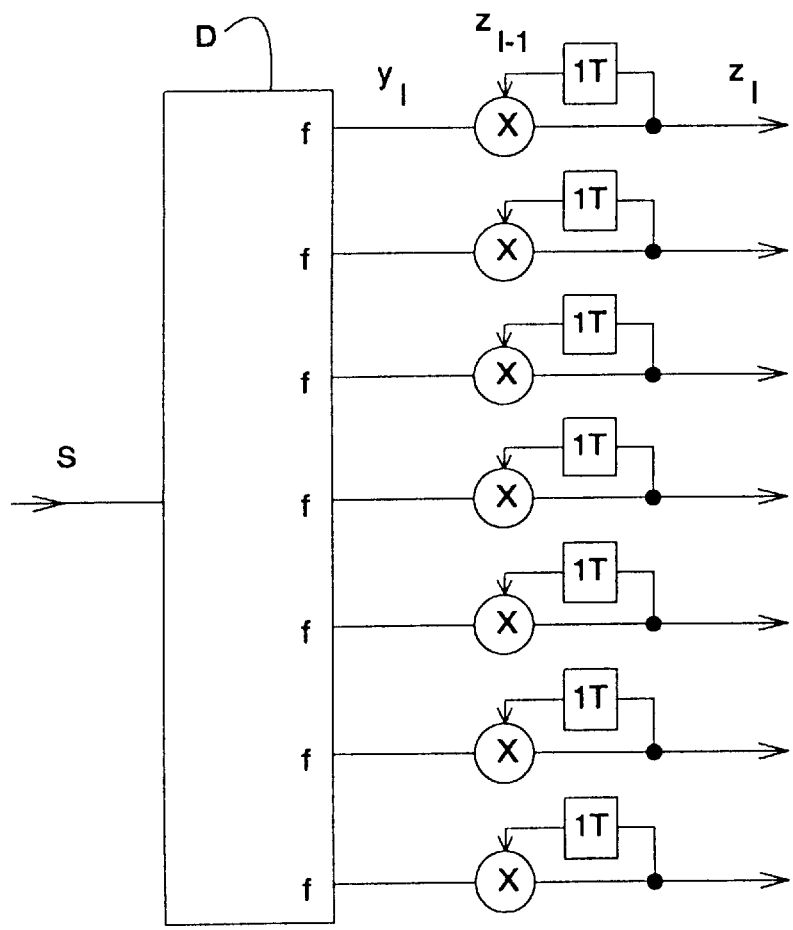
FIG. 4a represents as a block diagram a known phase modulator, which is used for generation of the OFMD symbol.
Figure 4B:
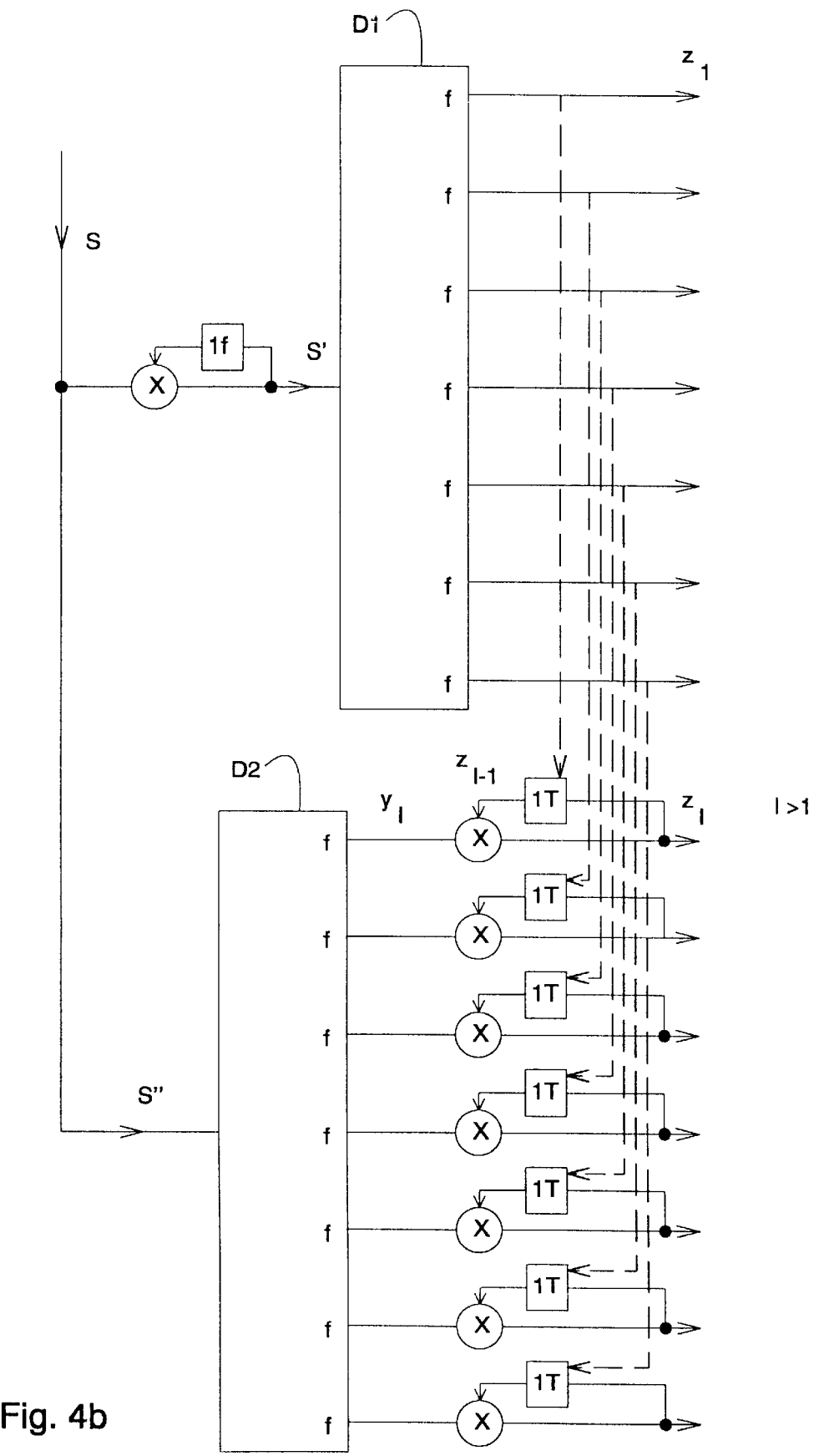
FIG. 4b represents as a block diagram a phase modulator according to the invention, which is used for generation of the OFDM symbol.

Next we will examine the transmitter—and receiver equipment according to the invention, with reference to FIGS. 4a and 4b.

FIG. 4a shows in the form of a block diagram phase modulator according to the prior art, in which the signal S is divided first into subfrequencies f in block D, after which differential quadrature phase-shift modulation is carried out at each subfrequency f using a delay block 1T which has the duration of the time constant of one system and by combining its output $z_{l-1,k}$ with the next information element for encoding $y_{l,k}$, which corresponds to the same subfrequency, in multiplier block X, in which case as the output of subfrequency k one obtains the lth elementary signal $z_{l,k}$.

FIG. 4b shows, in the form a block diagram of a corresponding level, a phase modulator according to the invention, where from the signal S one first of all separates that portion corresponding to the first OFDM symbol of the symbol sequence, on which phase modulation is carried out by using a "delay block" 1f of the content of one subfrequency in size, which block thus moves information essentially in the frequency—and not in time direction, and multiplier block X. Thereafter the phase-modulated signal S' corresponding to the first OFDM symbol is divided into subfrequencies f in block D1. The signal portion S", which represents other data for transmission belonging to the same symbol sequence, is divided into subfrequencies f in block D2 and at these subfrequencies phase modulation similar to that shown in FIG. 4a is carried out, but in such a way that to each subfrequency f is introduced, for another symbol in the sequence, information concerning the phase of the same subfrequency in the first symbol. This communication is represented by a broken line arrow. Realization of the signal processing functions according to FIG. 4b is best effected using a digital signal processor and by programming instructions relating to the performance of the blocks in question into memory means which are in use.

Figure 5:
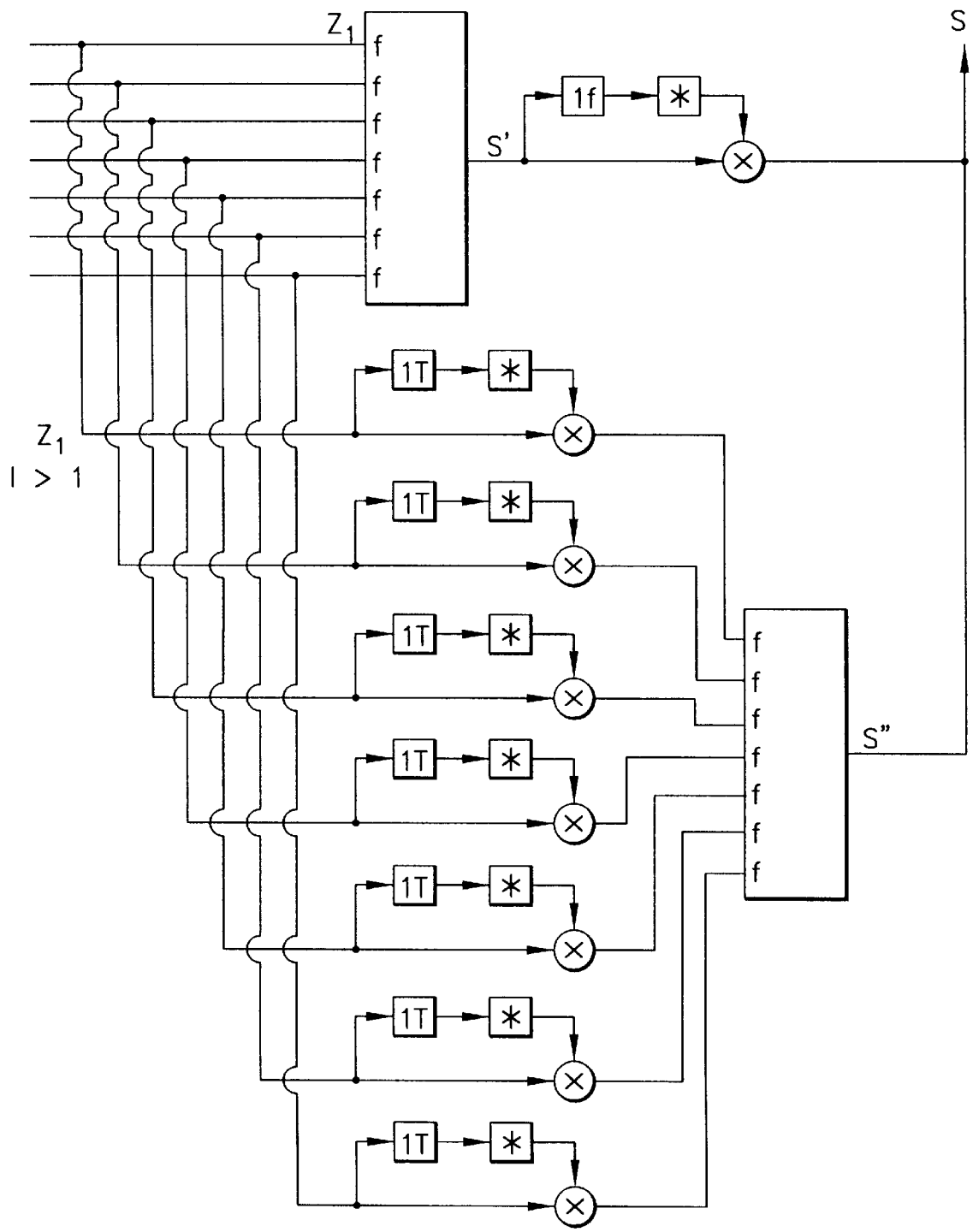
FIG. 5 represents as a block diagram a receiver embodiment of this invention.

Referring to FIG. 5, the operation of the receiver according to the invention corresponds in fundamental respects to what is said concerning operation of the transmitter according to the invention with reference to FIG. 4b, but in such a way that the actions occur in reverse order and use is made of direct Fourier transformation instead of inverse Fourier transformation. Furthermore, realization of signal processing functions required of the receiver according to the invention involves technology familiar to those skilled in the art and is likewise best effected using a digital signal processor and by programming instructions relating to the performance of the blocks in question into its memory devices which are in operation.

Compared with the prior art, this invention offers considerable advantages, particularly in radio communications systems employing OFDM technology, in which the same phase reference cannot, for one reason or another, be used for the decoding of a large number of successive OFDM symbols. A cellular telephone network based upon time-division multiple access as described above is regarded as a particularly favourable embodiment. The drawings and specific designations presented, such as OFDM, are not intended to restrict application of the invention to the systems indicated thereby, but have been employed to reveal the possible applications of the invention. The invention does not for example require that the subfrequencies between which phase information is transmitted be located at equal intervals in the frequency direction.

What is claimed is:

1. A method for the application of data for transfer to a radio-frequency signal, the generation of which is based upon a multiplexing of orthogonal frequency components, comprising a plurality of carriers of differing frequencies, which form subfrequency bands (f) and comprise in a time direction distinct elementary signals (R), in which the simultaneous elementary signals of different subfrequency bands form a symbol (OS; OS1), those symbols in temporal succession forming a symbol sequence, characterized in that said data for transfer are applied to said radio-frequency signal by a phase modulation method in accordance with the steps of:

providing a first symbol (OS1) of said symbol sequence to comprise a first elementary signal (Ref), which contains a phase reference, wherein the first symbol (OS1) comprises a group of other elementary signals, defining the information content of the group of other elementary signals as a phase shift in a frequency direction to an adjacent elementary signal for forming a differential phase shift chain, the head of which is said first elementary signal (Ref), and defining the information content of each elementary signal in other symbols of said symbol sequence as a phase shift to a preceding elementary signal in the time direction of the same subfrequency band for forming another differential phase shift chain, the head of which is the elementary signal of the first symbol (OS1) of said symbol sequence in the subfrequency band.

2. A method in accordance with claim 1, characterized in that said method further comprises a step of transmitting the radio-frequency signal from a transmitter device to a receiver device via a data transfer system which employs time-division multiple access, wherein symbol sequences are transmitted from said transmitter device to said receiver device in one particular time slot, the time interval of which determines said time-division multiple access.

3. A method in accordance with claim 1, characterized in that said method further comprises a step of dividing the group of elementary signals comprised by the first symbol (OS1) into two parts, wherein elementary signals (Ref) belonging to the first part are used for transmission of the phase references, and elementary signals belonging to the second part are used for transmission of actual data, and the ratio of the number of elementary signals in said first and second parts is about 1/100.

4. A transmitter device for application of data for transfer to a radio-frequency signal and for transmission of the data to a receiver, said transmitter device comprising apparatus (D1, D2) for the formation of subfrequency bands (f) which are formed from a plurality of orthogonal frequency components and for application of the data to said subfrequency bands as elementary signals of a certain length, characterized in that said transmitter device further comprises means (1f, X) for the formation of differential phase-shift keying between temporally simultaneous elementary signals belonging to different subfrequency bands (f) and means (1T,X) for the formation of differential phase-shift keying between temporally successive elementary signals belonging to the same subfrequency bands (f).

5. A receiver device for the reception of a radio-frequency signal and for the decoding of transferred data therefrom, said receiver device comprising apparatus for division of said radio-frequency signal into subfrequencies and for decoding data from said subfrequencies as elementary signals of a certain length in time, of which the temporally simultaneous elementary signals at different subfrequencies form a symbol, characterized in that said receiver device further comprises means for decoding data from differential phase-modulation chains formed by said elementary signals, which chains consist of elementary signals of the same symbol in different subfrequency bands, or elementary signals of the same subfrequency band in different symbols.

6. A method for applying data to a radio-frequency signal based upon a multiplexing of orthogonal frequency components, the radio-frequency signal comprising a plurality of carriers of differing frequencies which form subfrequency bands (f) and comprise in a time direction distinct elementary signals (R), where simultaneous elementary signals of different subfrequency bands form a symbol (OS, OS1), and where symbols in temporal succession form a symbol sequence, the data being applied to the radio-frequency signal by a phase modulation method in accordance with the steps of:

providing a first symbol (OS1) of the symbol sequence so as to comprise a first elementary signal (Ref) which contains a phase reference, wherein the first symbol comprises a group of other elementary signals;

defining the information content of the group of other elementary signals as a phase shift, in a frequency direction, to an adjacent elementary signal for forming a first differential phase shift chain, a head of the first differential phase shift chain being the first elementary signal (Ref), defining the information content of each elementary signal in other symbols of the symbol sequence as a phase shift to a preceding elementary signal in the time direction of the same subfrequency band for forming a second differential phase shift chain, the head of the second differential phase shift chain being the elementary signal of the first symbol (OS1) of the symbol sequence in a subfrequency band of interest, and dividing the group of elementary signals comprised of the first symbol (OS1) into two parts, wherein elementary signals (Ref) belonging to the first part are used for transmission of phase references, and elementary signals belonging to the second part are used for the transmission of data, and wherein a ratio of the number of elementary signals in the first and second parts is about 1/100.

7. A method as in claim 6, and further comprising a step of transmitting the radio-frequency signal from a transmitter device to a receiver device via a data transfer system which employs time-division multiple access, wherein symbol sequences are transmitted from the transmitter device to the receiver device in a time slot.

* * * * *